Patented Sept. 11, 1928.

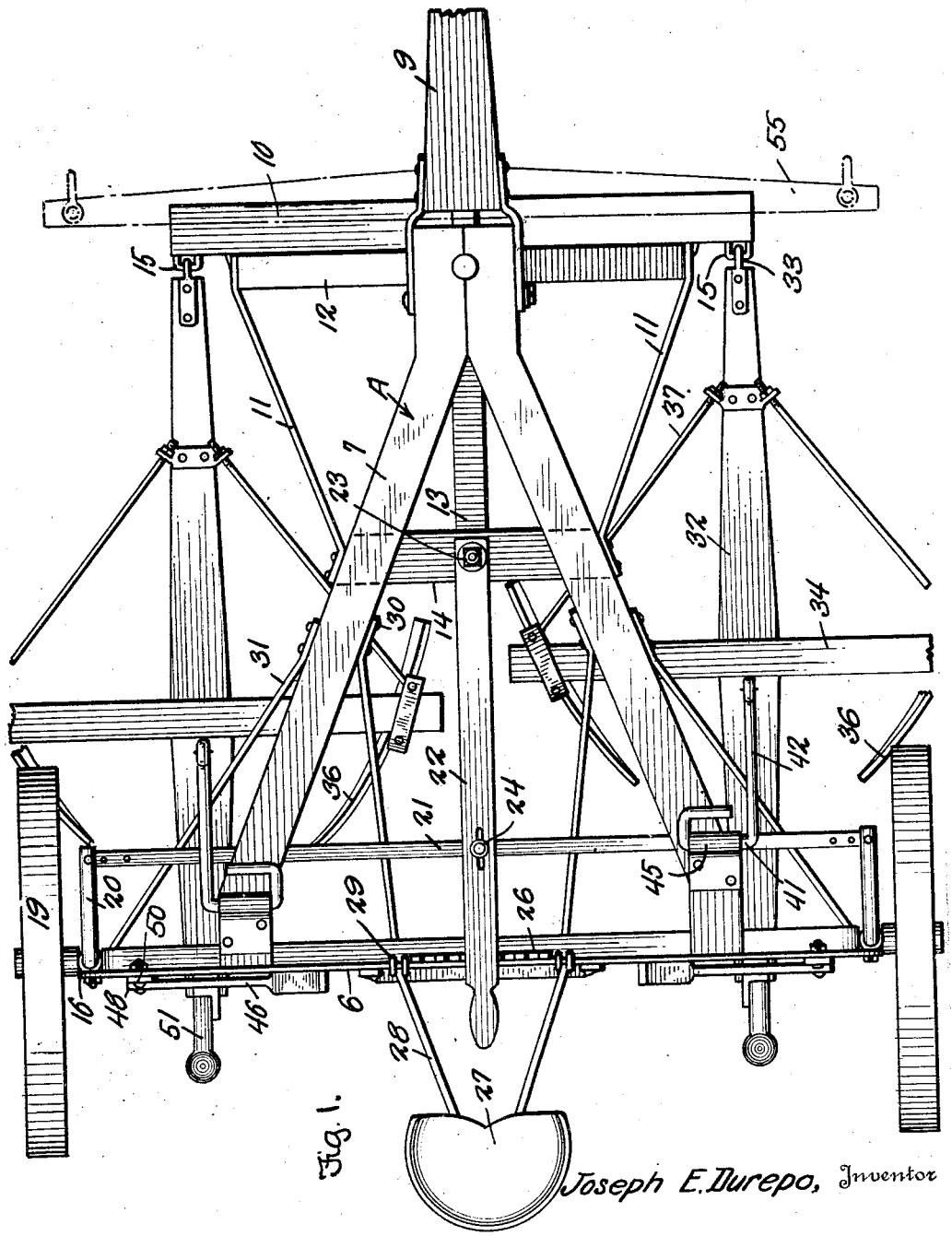

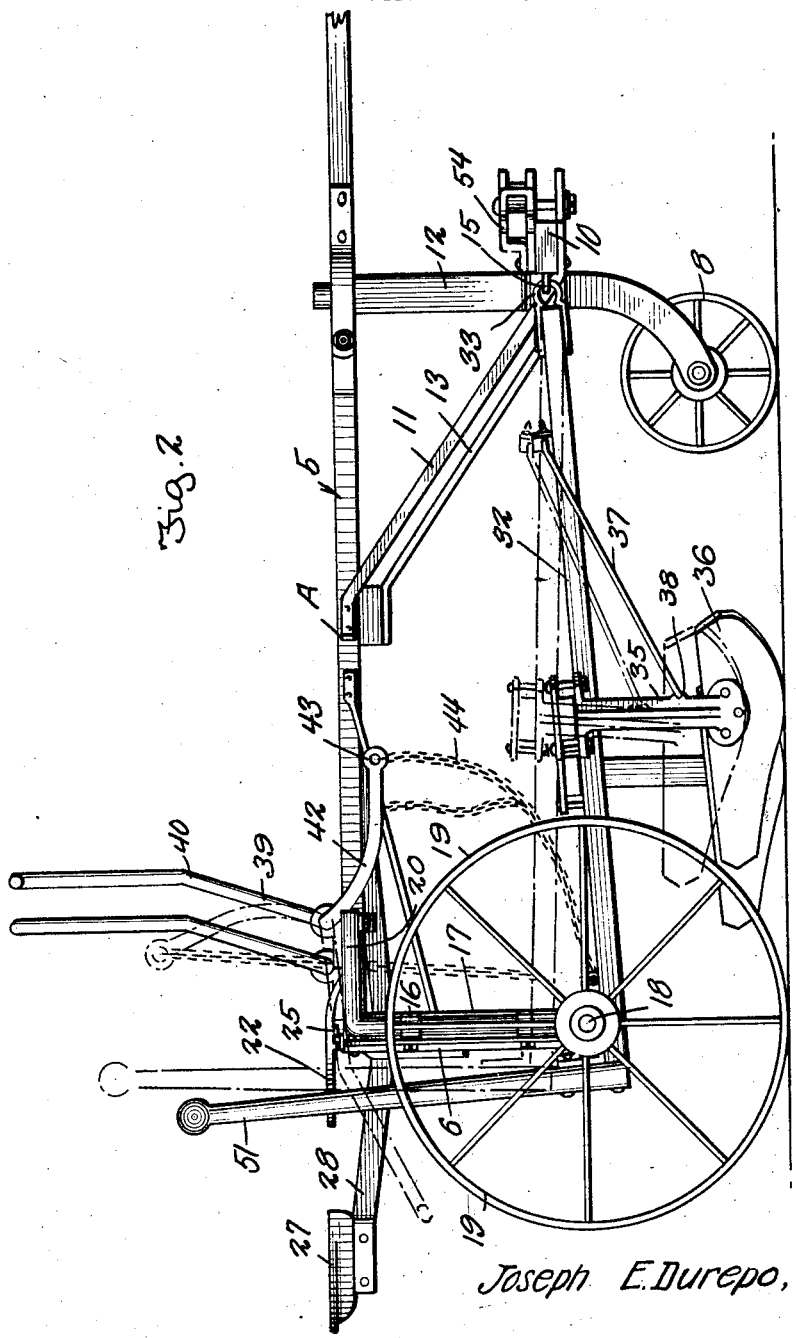

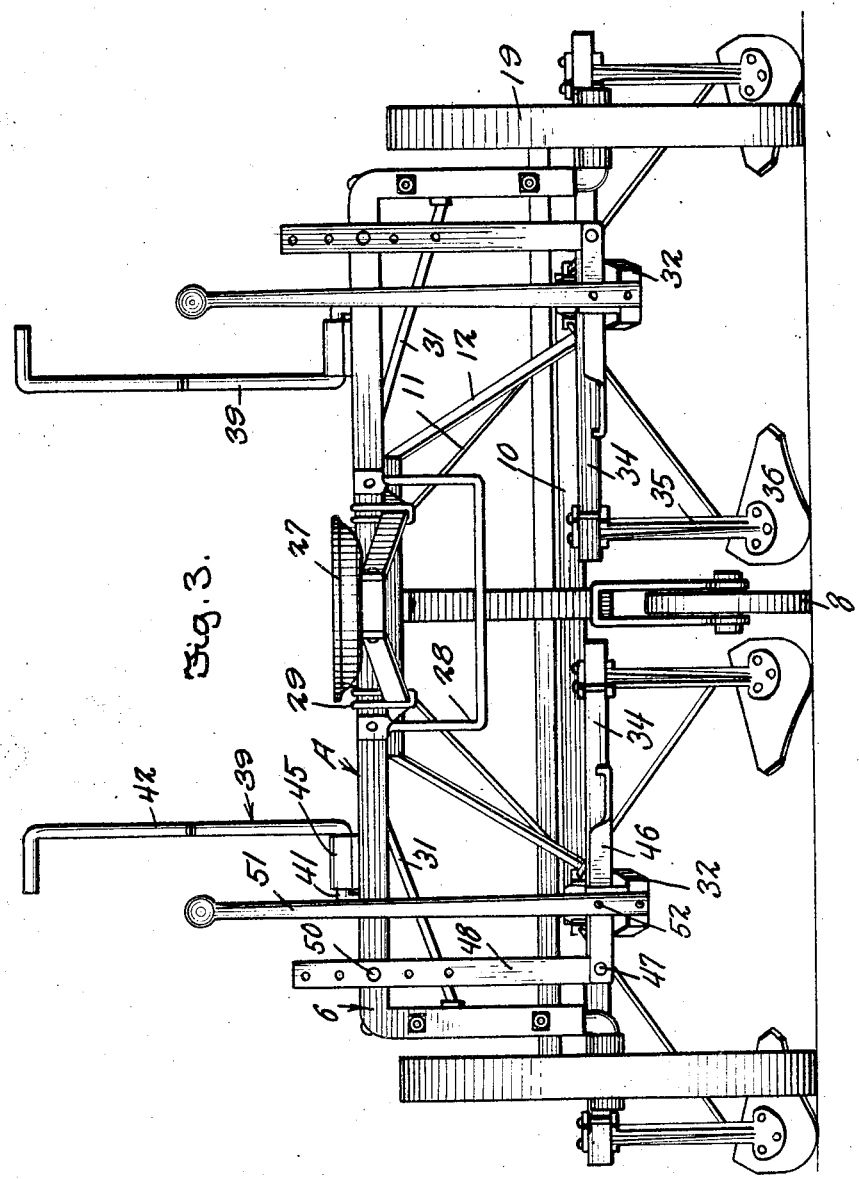

1,684,017

UNITED STATES PATENT OFFICE.

JOSEPH E. DUREPO, OF PRESQUE ISLE, MAINE.

POTATO HILLER.

Application filed March 5, 1927. Serial No. 173,114.

This invention relates to agricultural implements and more particularly to a novel potato hiller.

One of the primary objects of the present invention is to provide a potato hiller having a novel frame and novel means for mounting the blades upon the frame, whereby the blade beams can be adjusted relative to the growing plants.

Another salient feature of the invention is to provide an improved potato hiller which can be effectively used on a hill side, means being provided for adjusting the position of the main frame wheels, said means including a lever arranged adjacent to the driver's seat, whereby the same can be conveniently manipulated, the adjustment of the wheels also facilitating the steering of the vehicle.

A further object of the invention is the provision of novel means for raising the beams, whereby the hiller or hoe blades can be lifted above the level of the ground.

A further object of the invention is the provision of novel means for positively urging and holding the blades into proper engagement with the ground, and novel means for adjusting the blade beams laterally toward and away from one another.

A still further object of the invention is to provide an improved potato hiller of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a top plan view of the improved machine,

Figure 2 is a side elevation of the same, and

Figure 3 is a rear elevation of the improved machine.

Referring to the drawings in detail, wherein similar reference characters designate corresponding parts throughout the several views, the letter A generally indicates the improved potato hiller, which comprises a main frame 5 upon which the various parts of the device are mounted.

This main frame 5 includes a rear arch axle 6, which is preferably formed of angle iron, with its horizontal flange extending toward the front of the implement. The rear arch axle has connected thereto the forwardly extending reach bars 7, which gradually converge toward their forward ends. These ends are connected together in any desired way and form means for rotatably supporting the front caster wheel 8. The tongue 9 of the implement can be connected directly to the forward ends of the reach bars 7 if so desired, as clearly shown in Figures 1 and 2.

Arranged below the reach bars 7 and in front of the caster wheel 8 is a draw bar 10 which is connected to the reach bars. As shown forwardly extending straps 11 are secured to the opposite sides of the reach bars 7 and to the draw bar 10. As shown the straps 11 are connected to the draw bar 10 short of the ends thereof and are in turn connected with an arched strap or bracket 12, which has its upper end bolted to the reach bars 7. A central strap 13 is connected to the center of the draw bar 10 and this strap is connected to a transverse brace bar 14 secured to the reach bars 7. The rear face of the draw bar 10 at the terminals thereof is provided with loops 15, the purpose of which will be later described.

The vertical legs of the arch axle 6 receives suitable bearings 16 in which are rotatably mounted vertical arms 17 of steering wheel spindles 18 on which are rotatably mounted the main ground wheels 19. The upper ends of the vertical arms 17 of the wheel spindles 18 and formed thereon are connected thereto in any desired way, forwardly extending crank arms 20. These arms 20 are connected together by a transversely extending drag link bar 21.

It is obvious that by shifting the position of the link bar 21, that the angle of the wheels 19 can be changed, so as to bring about the steering of the implement and facilitate the use of the implement on a hillside.

The means for changing the angle of the ground wheels 19 comprises a shifting lever 22, which is arranged at the longitudinal axis of the frame and has its forward end pivoted as at 23 to the transverse cross bar 14 of the frame. This lever at a point intermediate its ends is connected by a pin and slot connection 24 with the drag link 21 and it is obvious that by moving the lever, that the angle of the wheels can be changed. In order to lock the lever 22 in an adjusted position, the under surface thereof is provided with teeth which are adapted to be engaged with the teeth of the rack bar 26, which is secured to the frame 5 in any desired way.

Directly in rear of the lever 22 is disposed the driver's seat 27 which can be connected with the frame in any desired way, such as by bracket arms 28. If desired these arms can be connected with the arch axle by means of U-bolts 29 at a point intermediate their ends and by fastening bolts 30 at their forward ends to the reach bars 7. It is also preferred to brace the arch axle from the reach bars 7 by the use of suitable tie rods or the like 31.

In accordance with this invention, the frame has arranged on each side of the longitudinal axis thereof blade supporting beams 32 and the forward ends of the beams are provided with eyes 33, which are connected with the eyes 15 of the draw bar 10 whereby the beams can be swung both in a vertical and horizontal plane, as will be later described. Each of the beams 32 has bolted or otherwise connected thereto transversely extending implement beams 34, the opposite ends of which are connected to standards 35 of the hiller blades 36. The standards 35 are so mounted upon the implement beams 34 that the same can be adjusted toward and away from one another when desired.

The hiller blades 36 are arranged at an angle to one another and at an angle to the longitudinal axis of the frame and are so disposed that they lie on opposite sides of a row of plants.

By this construction, two rows of potatoes can be hilled simultaneously. In order to brace the implement beams and the standards 35, suitable tie rods 37 are provided and these rods have their forward ends adjustably connected to the beams 32 and their rear ends hooked into eyes 38 formed on the implement standards.

It is to be noted that one implement beam 34 is arranged slightly in advance of the other, so that the hiller blades will be out of alinement and thereby allow the swinging of the beams 32 in a horizontal plane toward and away from one another.

In order to permit the raising and lowering of the beams 32, so as to swing the hiller blades into and out of engagement with the ground, elevating levers 39 are provided. Each of these levers include a manipulating handle 40, a laterally extending horizontally disposed bearing arm 41 and a lifting crank 42. The lifting cranks 42 are slightly arcuated as shown and the forward ends thereof are provided with eyes 43 for reception of chains 44, which are secured to the upper surfaces of the beams 32 adjacent to the rear end thereof. The horizontal bearing portions 41 of the elevating levers are rockably mounted in suitable bearings 45 carried by the reach bars 7.

When it is desired to elevate the beams 32 the elevating levers are drawn rearwardly which will lift up on the arms 42, causing the raising of the beams 32 and after the levers have been swung to their lowermost positions, the crank arms 42 will be swung in rear of the pivots or bearings 45 and the weight of the beams 32 will tend to move handle portions 40 of the elevating levers still further downward. As the levers abut the arch axle 6, further swinging movement of the elevating levers is prevented and this the beams 32 are automatically held in their raised position. This eliminates the use of locks and the like for the elevating means.

Means is provided for initially pushing the blades 36 into the ground and for holding the same in proper engagement with the ground and this means comprises inwardly directed foot pedals 46 arranged on each side of the longitudinal axis of the frame and each pedal is disposed adjacent to the driver's seat 16 and below the same. The outer ends of the levers or foot pedals 46 are pivotally connected as at 47 to depending strap arms 48, which are in turn pivotally connected as at 50 to the arch axle. It is to be noted that the bracket arms 48 are provided with a plurality of spaced openings, whereby the bracket arms can be connected at different adjusted positions on the arch axle. The rear terminal of the implement beam 32 has rigidly secured thereto an upwardly extending manipulating handle or lever 51 and these handles or levers 51 are disposed on opposite sides of the drag link bar 21 and are provided for the purpose of permitting the driver to draw the beams 32 toward or away from the longitudinal axis of the hiller. The foot pedals 46 are rockably connected at a point intermediate their ends as at 52 to the handles or levers 51 adjacent to their lower ends, but when the driver desires the blades to be forced into the ground, pressure is applied to the pedals which will swing the beams downwardly and blades into the ground.

When the beams 32 are raised by the elevating levers 39, the pedals 46 pivot on arms 48 and the arms 48 pivot on the arch axle 6.

When the device is used an a hillside, the lever 22 is shifted according to the slope of the ground. The shifting of the lever will change the angle of the wheels 19, so that the wheels will have a tendency to normally climb up the hillside.

The draw bar 10 has connected thereto by suitable clevis or the like 54, an evener bar 55, whereby draft animals can be readily connected to the device.

From the foregoing description, it can be seen that I have provided a potato hiller, which can be effectively used on hillsides and which can be readily steered and the implement beams readily controlled.

Changes in details may be made without departing from the spirit or the scope of this invention, but:

What I claim as new is:

1. An agricultural implement comprising a main frame, longitudinally extending implement beams connected at their forward terminals to the frame for swinging movement in a horizontal and in a vertical plane, transverse implement beams secured to the longitudinal beams, blades connected with said transverse beams, foot pedals arranged on opposite sides of the frame rockably connected with the frame at their outer ends and with the beams at a point intermediate their ends, whereby upon downward movement of the pedals, the blades will be urged into contact with the ground.

2. An agricultural machine comprising a frame including a front caster wheel, a rigid rear axle bar, ground wheels carried by said axle bar, longitudinally extending implement beams connected with the frame for swinging movement in a vertical and horizontal plane, means for raising the beams, and means for urging the implement beams toward the ground including inwardly directed pedals rockably mounted on the rear axle bar for swinging movement both in a horizontal and vertical plane, and means connecting the pedals at a point intermediate their ends to the rear ends of the implement beams.

3. An agricultural machine comprising a frame including a front caster wheel, a rigid rear axle, swinging steering wheel spindles connected with the rear axle having steering arms, a link connecting the steering arms together, rearwardly extending implement beams connected at their forward terminals to the frame on each side of the longitudinal axis thereof for movement in vertical and horizontal planes, crank levers rockably mounted at their angles on the frame, flexible chains connecting the levers with the beams for permitting the raising of said beams, the levers engaging the frame by the weight of the beams, when the beams are in their raised position, means for urging the beams toward the ground including inwardly directed foot pedals rockably carried by the rear axle for swinging movement both in a horizontal and a vertical plane, means connecting pedals at a point intermediate their ends to the rear ends of the beams, and means for steering the machine including a lever rockably secured to the frame at a point intermediate its ends having operative engagement with the wheel spindles.

In testimony whereof I affix my signature.

JOSEPH E. DUREPO.